United States Patent [19]
Sayell

[11] 3,767,930
[45] Oct. 23, 1973

[54] RADIOISOTOPIC HEAT SOURCE

[75] Inventor: Emerson H. Sayell, Phoenixville, Pa.

[73] Assignee: The United States of America as represented by the United States Atomic Energy Commission

[22] Filed: June 21, 1972

[21] Appl. No.: 265,057

[52] U.S. Cl.................. 250/493, 136/202, 250/496
[51] Int. Cl. ............................................ G21h 1/00
[58] Field of Search ................. 250/84, 106 S, 493, 250/496; 136/202

[56] References Cited
UNITED STATES PATENTS

| | | | |
|---|---|---|---|
| 3,570,784 | 3/1971 | Scheve............................ | 250/106 S |
| 2,476,644 | 7/1949 | Wallhausen et al............. | 250/106 S |
| 3,133,196 | 5/1964 | Rochlin .......................... | 250/106 S |
| 3,659,107 | 4/1972 | Selle ................................ | 250/84 X |

Primary Examiner—James W. Lawrence
Attorney—Roland A. Anderson

[57] ABSTRACT

A radioisotopic heat source which includes a core of heat productive, radioisotopic material, an impact resistant layer of graphite surrounding said core, and a shell of iridium metal intermediate the core and the impact layer. The source may also include a compliant mat of iridium between the core and the iridium shell, as well as an outer covering of iridium metal about the entire heat source.

5 Claims, 4 Drawing Figures

PATENTED OCT 23 1973  3,767,930

RADIOISOTOPIC HEAT SOURCE

BACKGROUND OF INVENTION

Reliable, long life, radioisotopic heat sources have a wide range of uses in connection with spacecraft and other power generation systems. Such heat sources may be used to provide thermal energy for electrical generating systems, including thermoelectric, thermionic and Carnot cycle generators, and for direct or indirect heating of personnel or equipment. It is generally desirable in such applications that the thermal energy produced by these heat sources, and consequently the temperature thereof, be maintained at high levels to improve thermoelectric conversion efficiencies or to meet other system requirements. A primary limitation to the thermal energies and temperatures which have been achieved in prior systems has been the materials used to confine the radioisotopic material. This has become particularly critical as the operating life span at these higher temperatures has been increased to meet other operation requirements since prior materials considered as high temperature and high strength materials, have not been as capable as might be wished of operating at desired temperature levels for long periods in the environments and conditions to which the heat sources may be subjected. In addition, in space applications, the heat source may be subjected to reentry temperatures which, added to the already high operating temperatures, and particularly after the heat source materials have been degraded over extended usage, may produce detrimental effects on the materials and structure of the heat source and cause failures. This is particularly critical because of the potential radioactive hazard or environmental contamination which may result if the radioisotopic material is released into the atmosphere from such a failure. The heat source materials must also be able to withstand abortive or non-ideal reentry conditions which may raise the temperature to which the heat source is subjected during reentry and also cause the heat source to impact against the earth or some other terrestial body at very high impact velocities.

SUMMARY OF INVENTION

In view of the above, it is an object of this invention to provide a novel radioisotopic heat source having inherently high impact resistance capabilities coupled with long term survivability at elevated temperatures.

Various other objects and advantages will appear from the following description of the invention, and the most novel features will be particularly pointed out hereinafter in connection with the claims. It will be understood that various changes in the details, materials and arrangement of the parts, which are herein described and illustrated in order to explain the nature of the invention may be made by those skilled in the art.

The invention comprises a core of heat productive radioisotopic material, an impact resistant layer of graphite surrounding said core, and a shell of iridium metal of from about 0.01 to 0.04 inch thick intermediate said core and the impact resistant layer.

DESCRIPTION OF DRAWING

The present invention is illustrated in the accompanying drawing wherein.

DETAILED DESCRIPTION

Figure 1:
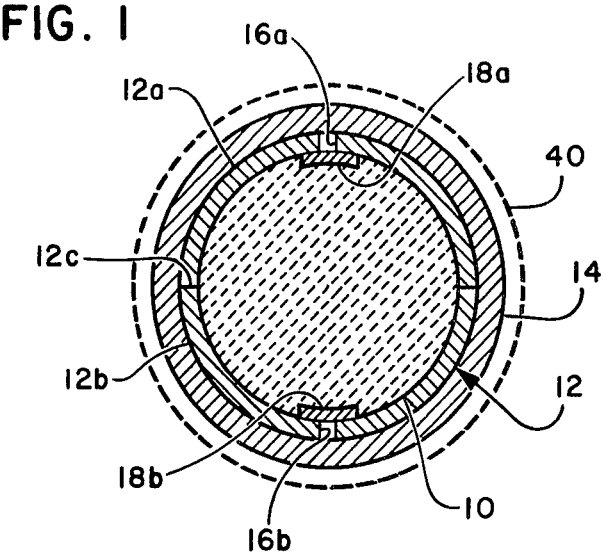
FIG. 1 is a cross-sectional view of a heat source device incorporating features of this invention.

As shown, the heat source device of this invention includes a central, spherical core 10 of radioactive isotopic material which is enclosed and surrounded by a high strength and high temperature resistant and chemically inert spherical shell 12. Shell 12, in turn, is enclosed within and surrounded by an impact resistant layer 14 which acts to spread or distribute impact loads to which the heat source may be subjected over a relatively large area of core 10 and shell 12.

The core 10 of each heat source may be appropriately formed from suitable radioactive isotopes, such as isotopes of plutonium, curium, strontium and actinium, which produce thermal energy from radioactive decay mechanisms. A particularly suitable radioactive isotope is that of plutonium-238 which has a relatively long half-life of 84.6 years and which may be used in a number of different forms. Appropriate forms thereof include plutonium dioxide ($PuO_2$) and/or a substoichiometric plutonium dioxide having a formula of from about $PuO_{1.6}$ to about $PuO_{1.98}$. Using the plutonium in the oxide form chemically stabilizes the plutonium metal and elevates the fuel maximum service temperature. The substoichiometric form is less reactive to other materials. The plutonium dioxide, either in the stoichiometric or substoichiometric form, may be used alone or as a ceramic fuel with a refractory oxide such as thorium dioxide mixed therewith, as a cermet in which a metal matrix is deposited around plutonium dioxide particles with or without a refractory like thorium dioxide and then pressed into a solid form (the metal matrix may include such as molybdenum and alloys thereof or the like), or combinations of these in varying arrangements. Even though these various fuels of plutonium dioxide dilute the powder density of the heat source fuel, they often provide improved thermal conductivity, strength, and chemical stability and similar properties.

The impact resistant layer 14 is made of a sufficient thickness to withstand the entire or a substantial portion of the impact load to which the heat source may be subjected. Layer 14 may be made of high strength material having suitable crush-up and thermal conductivity characteristics under high temperature environmental conditions. Such materials may include composite graphite made from woven or laid-up carbon using carbonizable threads or filaments or other forms thereof. The woven or otherwise formed carbon or carbonizable threads may be densified by appropriate pyrolytic deposition techniques. Layer 14 may be formed by continuous and random windings about core 10 and shell 12 or by separate forming into sections which may then be threaded or otherwise fastened together about core 10 and shell 12, as shown for example in FIG. 2. The material of which layer 14 is made should be capable of operating in temperatures of 1,500°C and above for extended periods of time. Other high temperature and high strength materials, such as refractory oxides, may be used to perform the desired functions under the enumerated environmental condition, for example, refractory oxides such as magnesia, hafnia, thoria, beryllia and zirconia, though for most applications graphite is preferred.

The intermediate shell 12 functions during fabrication, use and after impact, if the latter should occur, to minimize or prevent reactions between the radioactive isotopic material of core 10 and any surrounding materials, such as layer 14, and to prevent dispersal of the potentially hazardous radioactive material. Shell 12 must be made of a highly ductile material which is capable of performing its function after long life at high temperatures and after being subjected to shocks and high temperatures during reentry and impact, even though these environments may contribute to possible degradation of the shell, including solid and/or vapor state mass transer of materials that may have an adverse effect on material properties, lower melting temperature, or less oxidation resistance. It has been found that iridium exhibits both the elevated temperature toughness and chemical inertness required for such a shell and may be fabricated in this desired spherical shell configuration. Iridium is capable of providing protection of the heat source materials in an air environment even while being subjected to temperatures up to about 900°C, will remain stable with the radioisotopic material of core 12 and the impact resistant material (notably graphite) of layer 14 for years even at temperatures of about 1,500°C or more, and is capable of containing the radioisotopic material in core 10 for a minimum period of 1 year after impacting against granite at a temperature of about 1,400°C while traveling at a velocity of about 350 ft/sec. No interaction between the iridium and a plutonium fuel has been indicated after over 4,000 hours at a temperature of 1,370°C, or over a time period of greater than 1,000 hours at 1,500°C. An iridium shell 12 which is capable of exhibiting these properties may be formed from sheets of iridium into hemispherical shells 12a and 12b having a wall thickness of from about 0.01 to 0.04 inch and generally about 0.02 to about 0.03 inch thick. The hemispherical shells 12a and 12b may be joined at their peripheries by appropriate tungsten inert gas welding techniques or the like. If it is desired to optimize desired properties of shell 12, small additions of such as ruthenium, platinum, osmium, and tungsten or combinations thereof, may be alloyed with the iridium. In addition, intermetallic materials of iridium with such as hafnium, zirconium, molybdenum and the like may be desirable in some applications.

It has been found that iridium is insensitive to strain rates up to 4,000 inches/inch/minute and that while the strength of recrystallized iridium is about one-third that of wrought and stress relieved iridium at room temperature, the wrought iridium loses strength when tested to 1,370°C while recrystallized iridium strength remains essentially unchanged. The ductility of iridium increases from about 5 percent at room temperature to about 50 percent at 1,370°C. In addition, iridium does not oxidize even when heated to 850°C in air whether strained or unstrained and is not noticeably degraded with respect to oxidation resistance when in the presence of carbon.

Since the radioactive material used for core 10 may produce helium gas from the radioactive decay of the isotope, some provision may be provided for release of excessive helium build-up within the heat source and particularly within the shell 12. Such may be achieved by providing a very small diameter hole, generally from about 0.0004 to about 0.0008 inch in diameter, through some portion of the shell 12, such as through the hole 16a of hemispherical shell 12a, shown by exaggeration. Even though the holes are of extremely small size as described, it may be desirable to provide a filter element 18a to block exit or migration of micron size solid fuel particles or fines from spherical core 10 through hole 16a. Additional holes and filter elements may be provided at other portions of the shell 12, such as shown by the hole 16b and filter element 18b in hemispherical shell 12b. FIG. 1a shows in greater detail a possible construction of a filter element which utilizes a first disc 20 having appropriate powder 22 sintered to its surfaces (the powder layer is shown with exaggerated thickness for purpose of illustration and may typically be about 0.003 inch thick) with the same welded to the inner surface of shell 12. The powder used may preferably be from about 0.1 to 25 microns in size. The welds and powder provide a tortuous path for these small size fuel particles so as to block the same from reaching the hole through shell 12. Thus, the weld, which may be of either tack or continuous weld type, should be such as to not completely seal disc 20 through powder 22 to the inner surface of shell 12. An additional disc 24 may be similarly welded over the top of disc 20 to hold it against shell 12 and prevent dislodgement from shell 12 due to shocks or other environmental conditions and, if desired, provide additional tortuous paths between disc 24 and disc 20 in powder 22 for blocking passage of fuel particles. Discs 20 and 24 may also be simultaneously welded to the inner surface of the shell 12. The discs 20 and 24 may be made of the same or similar material as shell 12 of equal or near equal thickness and size, generally of about 0.002 and 0.005 inch thickness respectively and about 0.5 inch in diameter. Powder 22 may be of the same material and/or some refractory material such as hafnia which is chemically inert to the materials used in the heat source under the environmental conditions to which it may be subjected. It will be apparent that other filter elements may be used in place of that shown by element 18a in FIG. 1a, such as by use of sintered frits and cermets.

Figure 2:
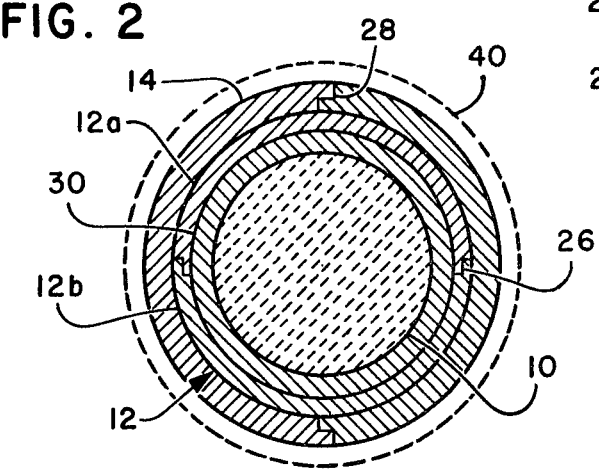
FIG. 2 is a cross-sectional view of an alternate embodiment of the heat source device.

The embodiment shown in FIG. 2 shows additional details or variations which may be incorporated in the heat source. For example, the joint between the respective hemispheres 12a and 12b may be formed with a step 26, as shown, to provide a more effective weld closure and to more accurately align the respective hemispherical shells together. In addition, the impact resistance layer 14 of graphite or the like may also be provided with a step joint 28 which may be provided with threads for ready alignment and connection together or it may be fastened together by sealants or adhesives or as described above. Even though the iridium shell 12 has been found to exhibit very high compliance via excellent expansion match at the usual operating temperatures of the heat source, there may be environmental conditions or lower operating temperatures at which additional compliance or resiliency may be desirable to insure adequate shock absorption capabilities. These may be achieved by positioning a woven wire mat or corrugated foil or screen 30 intermediate spherical core 10 and spherical shell 12 and made of the same material as shell 12. For example, iridium or Ir alloy wires of from about 0.001 inch in diameter to about 0.005 inch in diameter may be woven around core 10 or separately woven into a screen that is bent and then fastened about core 10 to provide a "spring-like" containment of core 10 within shell 12. Such will provide additional impact resistance and shock or vibration resistance at any operating temperature of the heat source over that provided by shell 12 itself and minimize possible damage to core 10 and production of fuel fines. While a woven "mat" gives good results, the mat might also be formed by windings, a sintered layer or otherwise.

Figure 1A:
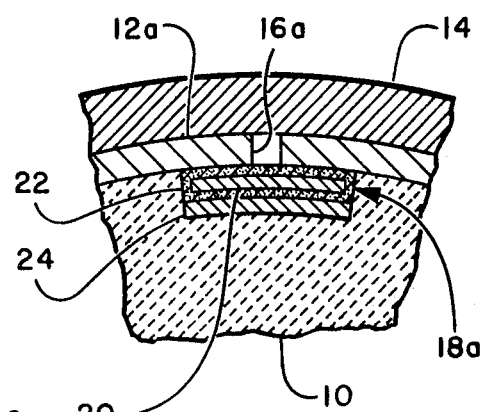
FIG. 1a is a fragmentary, enlarged view of a portion of the heat source device of FIG. 1 showing details of its construction.
Figure 3:
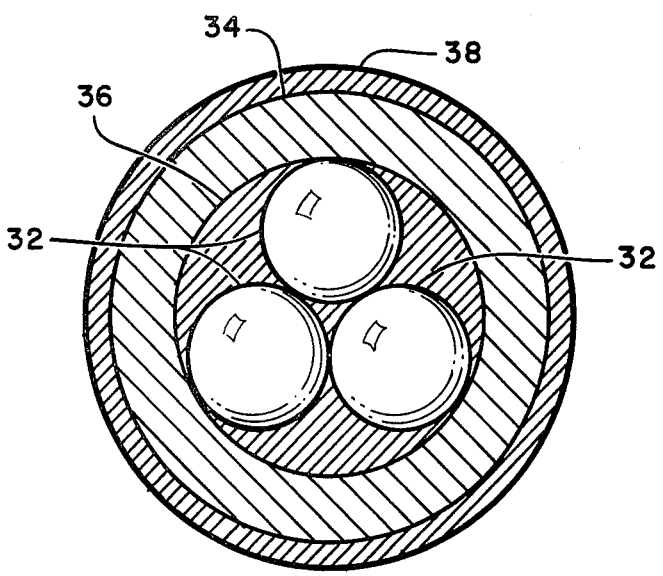
FIG. 3 is a view, partially in cross section, of a heat source system incorporating a plurality of the heat source devices shown in either FIG. 1 or FIG. 2.

The heat sources which have been shown in FIGS. 1 and 2 may be used in any appropriate configuration or arrangement to provide heat or thermal energy to a desired apparatus or use. For example, the individual spherical heat sources may be distributed in some regular pattern as described in the copending application to *Radioisotope Heat Source System* by James F. Bunker, Emerson H. Sayell, James E. Poland and George V. Schmidt, filed June 4, 1971 having Ser. No. 149,967(70) and now U.S. Pat. No. 3,697,329. For example, the heat source devices shown by heat source devices 32 in FIG. 3 may be distributed along the axis of a tubular ablative shield 34 in multiple levels with two or more heat sources on each level, such as the three shown, with each of the heat sources disposed within appropriate recesses of an impact absorbing and retaining member 36. Ablative shield 34 and member 36 may be made of appropriate material such as carbon or graphite. The entire arrangement may then be clad, or enclosed within a suitable shell or cladding 38 of the same or similar material as shell 12 of the heat sources. The cladding 38 serves to maintain helium pressure within the entire heat source arrangement, to maintain good heat conductivity between the respective elements thereof and allows for safe handling while providing protection against premature ablation of the ablator 35 until the desired time of reentry. Cladding 38 may be provided with appropriate helium venting means, such as described above, or other controlled vents so as to prevent excessive helium build-up. It is understood that a similar cladding may be positioned about individual heat source devices, such as shown generally by layers 40 in FIGS. 1 and 2, to provide similar protection, if desired. The cladding 38 may be formed from sheet material welded into a tubular shape and end plates, not shown, welded at each end thereof to enclose the entire arrangement. The outside of can 38 may be plasma sprayed with such as hafnia and iridium powder to enhance the thermal emissivity of its surface; an impregnated carbon liner is a good substitute for the refractory oxide coating since it will improve emissivity and greatly enhance hoop strength of the clad. The entire arrangement may then be appropriately positioned adjacent to thermoelectric power generating devices or suitable heat exchange devices for utilization of the heat source thermal energy.

What is claimed is:

1. A high temperature resistant radioisotopic heat source for subjection to temperatures of 900°C and above for extended periods of time without degradation comprising a spherical core of heat productive plutonium radioisotopic material, an impact resistant layer of graphite of substantially uniform thickness radially spaced from and completely enclosing said core, and a shell of iridium metal of from about 0.010 inch to about 0.40 inch thick completely enclosing said core and disposed intermediate said core and said impact resistant layer and totally confined within said layer.

2. The source of claim 1 wherein said core is of plutonium-238 dioxide and the shell is comprised of hemispherical elements with abutting marginal edges joined together about said edges.

3. The source of claim 1 including a gas venting passageway extending from said core to an interior surface of said impact resistant layer through said shell and means in said passageway for impeding flow of said radioisotopic material through said gas venting passageway.

4. The source of claim 1 including a woven wire screen mat intermediate said shell and core of from about 0.003 to 0.010 inch thick, said wire being of iridium from about 0.001 to 0.005 inch diameter.

5. The source of claim 1 including an outermost additional enclosing shell of iridium disposed about said graphite layer.

* * * * *